Figure 1:
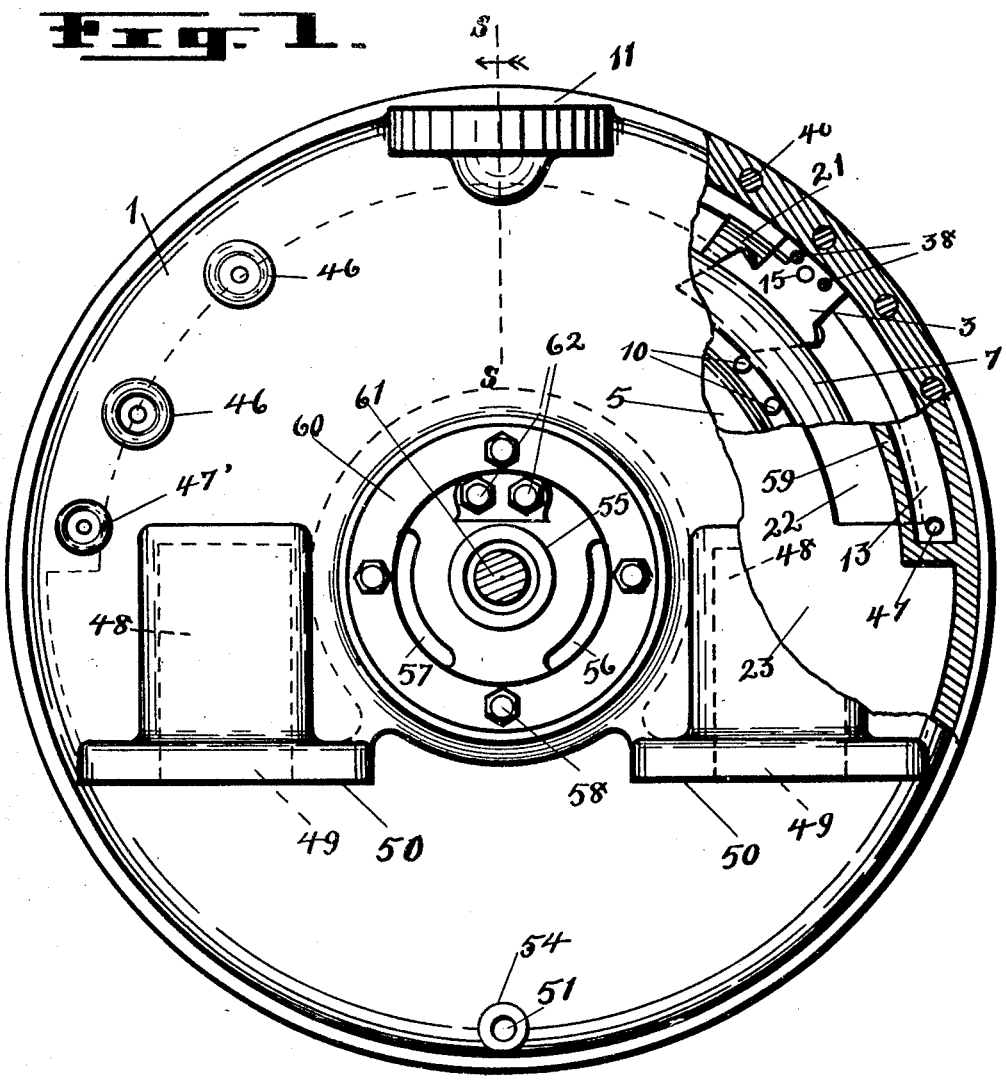

No. 887,380. PATENTED MAY 12, 1908.
C. W. DAKE.
ELASTIC FLUID TURBINE.
APPLICATION FILED OCT. 1, 1906.

4 SHEETS—SHEET 1.

WITNESSES:
Lulu J. Greenfield
C. E. Braden

INVENTOR.
Charles W. Dake.
BY Chappell & Earl
ATTORNEYS

No. 887,380. PATENTED MAY 12, 1908.
C. W. DAKE.
ELASTIC FLUID TURBINE.
APPLICATION FILED OCT. 1, 1906.
4 SHEETS—SHEET 2.
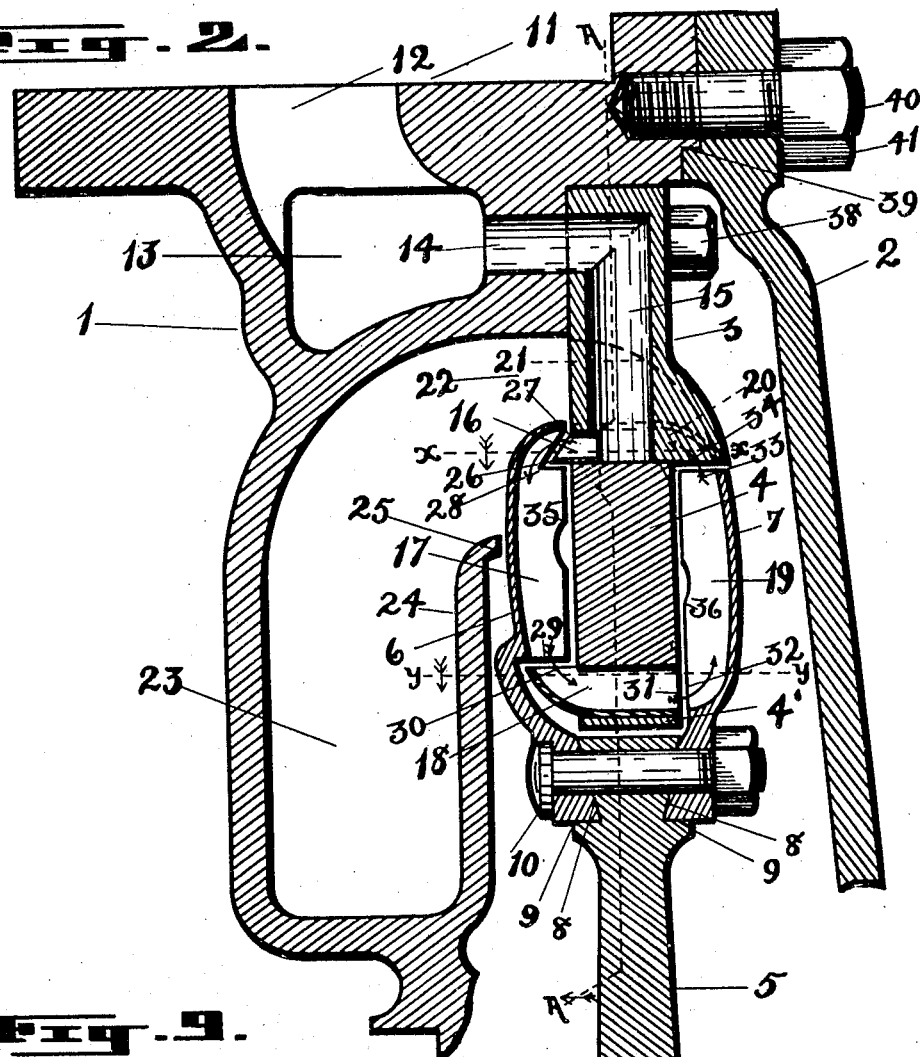
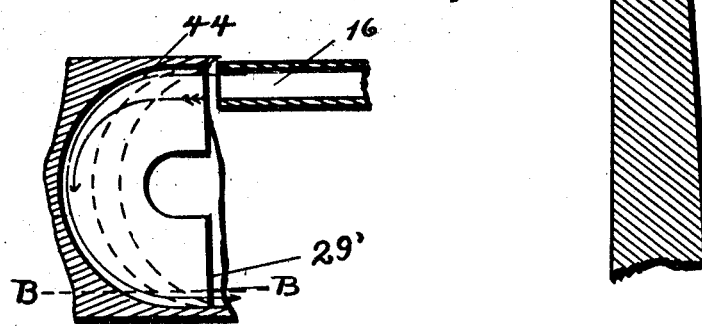
WITNESSES:
Lulu G. Greenfield
C. E. Braden
INVENTOR.
Charles. W. Dake.
BY Chappell & Earl
ATTORNEYS

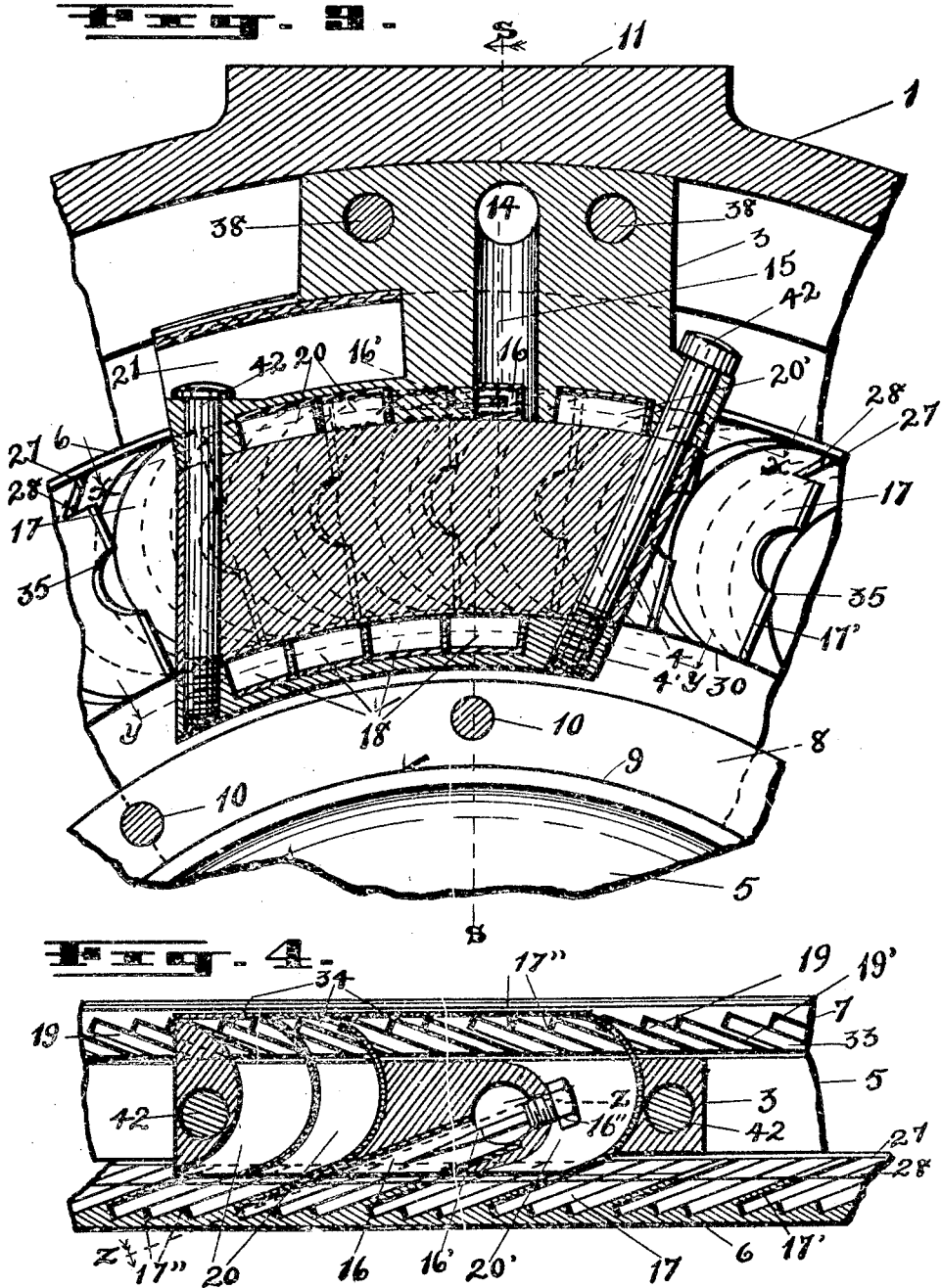

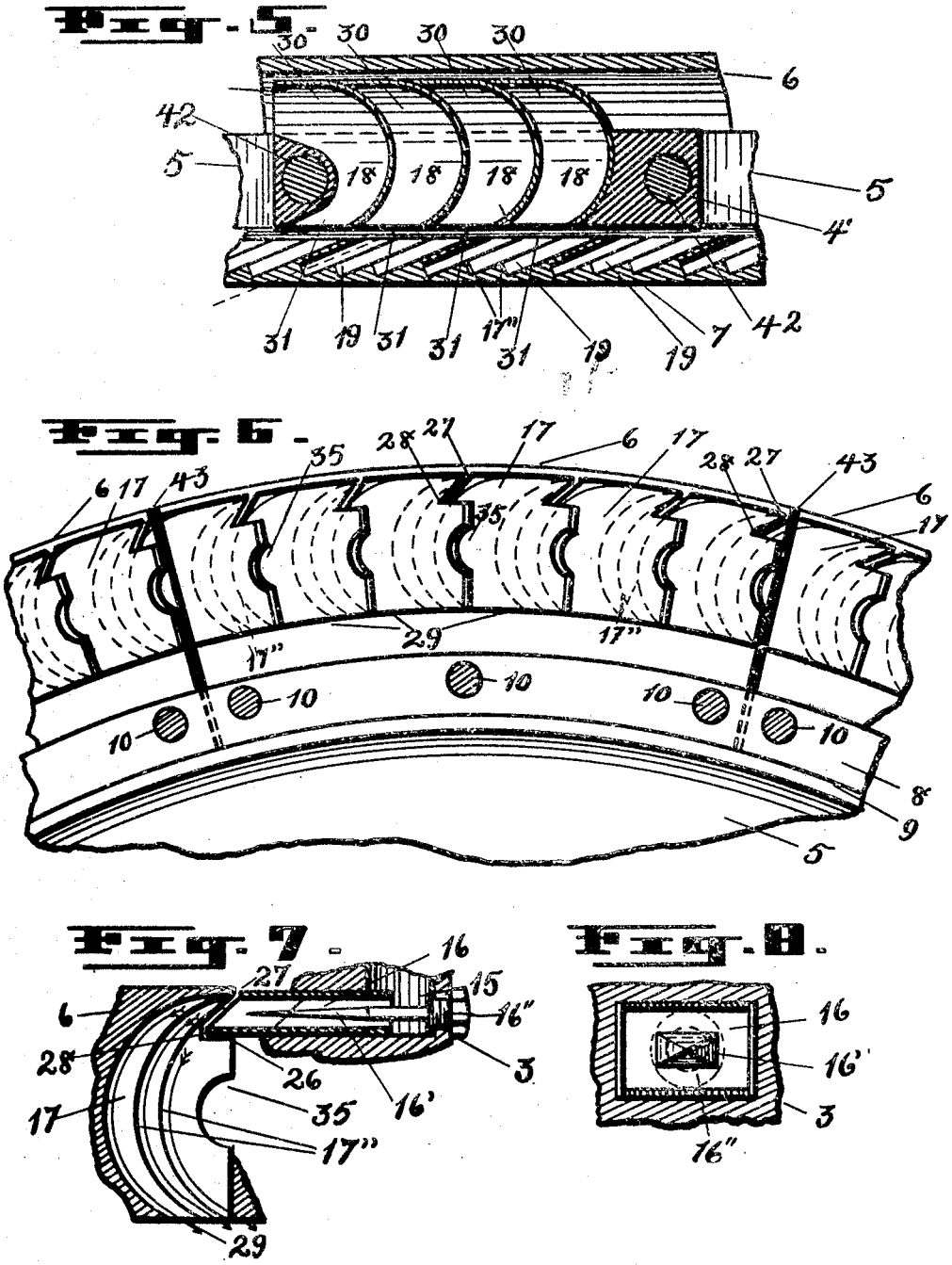

UNITED STATES PATENT OFFICE.

CHARLES W. DAKE, OF GRAND RAPIDS, MICHIGAN, ASSIGNOR TO THE DAKE-AMERICAN STEAM TURBINE COMPANY, OF GRAND RAPIDS, MICHIGAN, A CORPORATION OF MICHIGAN.

ELASTIC-FLUID TURBINE.

No. 887,380.      Specification of Letters Patent.      Patented May 12, 1908.

Application filed October 1, 1906. Serial No. 336,883.

*To all whom it may concern:*

Be it known that I, CHARLES W. DAKE, a citizen of the United States, residing at Grand Rapids, in the county of Kent, State of Michigan, have invented certain new and useful Improvements in Elastic-Fluid Turbines, of which the following is a specification.

This invention relates to improvements in elastic fluid turbine engines.

The object of the invention is to increase the efficiency of such turbine engines in a comparatively simple structure, and also in certain particulars to economize in the manufacture.

I accomplish the objects of my invention by the devices and means described in the following specification.

The invention is clearly defined and pointed out in the claims.

A structure embodying the various features of my invention is sufficiently illustrated in the accompanying drawing forming a part of this specification, in which:

Figure 1 is a rear elevation view of my improved turbine engine ready to be mounted upon a suitable foundation or support; Fig. 2 is an enlarged detail sectional view taken on the line S—S of Figs. 1 and 3, through the turbine casing and a portion of the turbine wheel, sufficient to show the cross section of fluid passages, buckets, nozzles, etc.; Fig. 3 is an enlarged detail sectional view taken on the line A—A of Fig. 2, which is longitudinal through the nozzle and guide passage blocks and adjacent parts, portions being also indicated by dotted lines; Fig. 4 is a detail sectional view taken on the curved plane indicated by lines X—X of Figs. 2 and 3, developed into the flat; Fig. 5 is a detail sectional view taken on the curved plane indicated by line Y—Y of Figs. 2 and 3, also developed into the flat; Fig. 6 is a detail view, the joining bolts 10 being shown in section, showing an inner view of one of the rows of turbine buckets, indicating also the segmental construction; Fig. 7 is an enlarged detail sectional view taken on the irregular line z—z of Fig. 4, showing clearly the arrangement of the nozzles projecting into the buckets and the annular groove on the partitions separating the buckets of the row, that permit this arrangement; Fig. 8 is an enlarged detail view looking into the discharge end of one of the nozzles; and Fig. 9 is a detail sectional view corresponding to the view of Fig. 7 which shows an old design of buckets and nozzles on which my present invention is an improvement.

In the drawing, the sectional views are taken looking in the direction of the little arrows at the end of the sectional lines, and similar numerals of reference refer to similar parts throughout the several views.

Referring to the numbered parts of the drawing, the turbine casing 1 is provided with a front cover 2 (see Figs. 1 and 2), and the casing is provided with feet or flanges 50 by means of which the engine is secured to a suitable base or support. It is through these flanges that the passages 48 lead down to apertures 49 down through the base, for carrying away the exhaust.

The guide passages and nozzles are formed in suitable blocks 3, 4 and 4', the block 3 being secured by suitable bolts 38 to the casing 1, and the blocks 3, 4 and 4' being secured together by radially-arranged bolts or screws 42. A nozzle 16 and passages 18—18—18—18—20—20 and 20', hereafter to be described, are secured between these blocks by suitable sheet metal bodies of proper form, inserted between the same and clamped by the said bolts 42.

A turbine wheel 5 is provided with bucket segments 6 and 7 on its periphery, which are fitted together end to end on radial lines, the same being slightly separated by a yielding insulating material 43 between the same to permit of their independent contraction and expansion, the bucket segments usually being made of a different quality of metal and having a different degree of expansion from the turbine wheel. The periphery of the turbine wheel 5 is formed dove-tailed at 8 with shoulders 9 at each side, against which the bucket segments 6 and 7 abut, suitable form projecting flanges being provided for that purpose. Bolts 10 extend through these flanges and the dovetail 8 and clamp the parts securely together, so that when the bolts are drawn tight the bucket segments fit securely against the shoulders 9, owing to the dovetailed form of the periphery of the wheel 5. A row of buckets 17 is formed in the segments 6, the same being of the U-shaped recurved type, and similar buckets 19 are formed in the bucket segments 7. These buckets each receive the elastic fluid at their side and discharge it from the end.

A nozzle 16 is provided, having one side 26 elongated and projecting into a groove or notch 28 in the partitions between the buckets 17, as clearly appears in Figs. 2 and 7, the notches 28 to form the groove also distinctly appearing in Fig. 6. The short side of the nozzle, 27, projects only to the outer edge of the bucket and does not extend within. Between the blocks 4 and 4' are guide passages 18 produced by sheet metal bodies of proper form clamped between the same. These are of the re-curved type and receive the fluid at their sides and discharge it from their ends. The forms, being stamped from sheet metal and clamped between the parts, are very readily produced and assembled. Turbine buckets 19 are formed in the segments 7 and, at their sides toward their inner ends, towards the center of the wheel, embrace the discharge end of the recurved passages 18, so that they receive the elastic fluid at their side, as indicated at 32, the discharge occurring at 31 from the end of the recurved passage 18. The outer ends of the recurved buckets 19 are cut off so that the elastic fluid is discharged from the end 33 and is received at the side 34 of the passage 20. The guide passages 20 are also produced by sheet metal bodies of proper form clamped between the blocks 3 and 4 in proximity to the nozzle 16.

20' is a steam or elastic fluid passage, also produced by a sheet metal form, which takes care of the spill from the nozzle and other parts and insures its proper travel through the turbine to utilize what force there may be in its expansion. This is of very slight consequence, however.

The nozzle 16 is formed of sheet metal and is inserted into the block 3, the edge 26 towards the inside of the bucket projecting deep within the buckets. Within the nozzle 16, which is preferably made square or rectangular, as seen in Fig. 8 where it is much enlarged, is a pyramidal core 16' which is secured by a suitable screw thread in the block 3 centrally within the nozzle, the same being detachably secured there. The sides of this core being substantially pyramidal in form, a nozzle is produced of increasing cross-sectional area, the sides of which are perfectly straight and parallel, so that there is not a waste of force in the nozzle as is the case where the expansion is secured by the expansion or flaring of the sides of the nozzle. This central projecting core 16' is made removable by a suitable screw sleeve 16'' so that cores of different dimensions and with different angles to the converging sides can be substituted to accommodate the engine to different pressures and different conditions under which it may be desired to operate. The core 16' is screwed into the sleeve 16''.

The advantage of extending the nozzle into the bucket will appear by comparing the structures of Figs. 7 and 9, Fig. 9 illustrating an old design. The steam or elastic fluid passing as indicated by the arrow in Fig. 9 from that side of the nozzle 16 there indicated, has a longer distance to travel before it contacts with the wall of the bucket 44 and, as a consequence, as this distance is quite material, it is impossible to secure the even discharge of the steam or elastic fluid in a device of this character; whereas, by projecting the nozzle into the bucket the steam or elastic fluid all travels substantially the same distance and the best results of its impact are thus obtained. The line B—B of Fig. 9 shows where the U-shaped buckets are cut off so that the steam or elastic fluid discharges from its end in place of its side, as would be the case if it discharged as at 29'. The steam or elastic fluid discharges from the end as indicated at 29 in Fig. 7.

The buckets 17 and 18 are of the step type, as clearly appears in Figs. 4, 5 and 7, so that the steam or elastic fluid delivered into the same is equally effective at all points, the steps being clearly indicated by the reference numeral 17'' in Figs. 4, 5 and 7, the partitions between the various buckets being indicated by the numeral 17' in Figs. 4 and 5. A series of these nozzles and guide passage blocks are provided connecting to an annular passage 13 which is supplied through the opening 12, a flange 11 being provided for the connection. Passages 14 lead from the annular passage or chamber 13 to the block 3, thence down through the passage 15 to the nozzle 17, and the fluid escapes from the buckets and is discharged into the passage 21 whence it delivers through the mouth 22 into the annular passage 23 which is connected by passages 48 down through the base of the machine. The annular chamber 23 is provided with a wall 24 adjacent to the turbine wheel, with a projecting flange 25 which extends into close relation with the outside of the buckets 17 to make a joint as near steam tight as it is possible to utilize in an elastic fluid turbine, at that point. The turbine wheel 5 is carried on a shaft 61 and that shaft is supported in suitable bearings 55 which are secured to the casing by the bolts 58 connecting to the flange 60. Passages 56 and 57 admit air around the journal bearing 55. The bearing is adjustable by the adjusting screw 62. The passage 13 is separated from the exhaust chamber 23 by the wall 59. In the bottom of the casing is a drain-hole 51 surrounded by a boss 54. Stop-off valves 46 are provided for the several nozzle sections, two being shown in Fig. 5. A drain-hole 47, controlled by the valve 47', is provided for draining the supply chamber.

Having thus described the various parts of my improved turbine engine, I will now indicate the course of the elastic fluid or steam therethrough and the operation of the various parts.

The steam or elastic fluid enters at the passage 12 into the annular space 13 and passes thence to each of the nozzle and passage blocks through the respective passages 14, down through the passage 15 to the nozzle 16, the proper nozzle core 16' insuring proper expansion. The steam or elastic fluid passes from the nozzle 16 and, owing to the inner projection at the point 26 of the same, is delivered so that its impact is most advantageously utilized in the buckets 17, steps 17' of the bucket insuring its proper action, and it then discharges at the end 29 of the bucket into the side 30 of the recurved passage 18 where the steam curves upon itself and is discharged from the end 31 of that passage into the side 32 of the bucket 19, whence the steam or elastic fluid acts upon the bucket, the same as in 17, and is discharged from the end 33 thereof into the side 34 of the passage 20; and thence from the passage 20 may discharge into the buckets 17, recurved passage 18, bucket 19, and the second passage 20; and from thence into the passage 21 through the mouth into the central annular exhaust chamber 23, from thence through the passages 48 down through the base of the machine to the open air or to a condenser, as the case may be. The circulation of the steam or elastic fluid through the buckets may be repeated as often as desired, depending on the pressure and service required. A course twice through the buckets is usually sufficient.

The advantages of the various structures appear from the recitation of their operation, and the facility of manufacture is apparent from the description of the various parts.

Many of the features which I have described may of course be utilized without others which I have mentioned, and all may be modified, but it is clear that they all co-act to secure the best results.

Having thus described my invention, what I claim as new and desire to secure by Letters Patent, is:

1. In an elastic fluid turbine, the combination of the casing 1, provided with the annular supply chamber 13; a suitable cover plate 2 therefor; a nozzle and passage section made up of the block 3 having the passages 14—15 connecting therethrough from the supply chamber 13, a main block 4, and a centrally-arranged block 4', and a nozzle 16, rectangular in cross-section, with one side elongated, provided with a detachable pyramidal core 16' arranged between said blocks 3 and 4; guide passages 20 and 18 molded in sheet metal bodies clamped between the said blocks, the receiving sides of which extend beyond the core-block 4 and the discharge ends of which are even with the core-block, and exit passages 21 for each nozzle and passage section between the blocks 3 and 4; a turbine disk 5 with a dovetail-shaped periphery 8 provided with shoulders 9—9; bucket segments 6 and 7 separated from each other by a yielding elastic material and provided with flanges conformed to the said dovetail, with bolts therethrough and having buckets of the recurved U-shaped type with stepped walls cut away at the point of discharge so that they will discharge from their ends into the sides of the recurved passages and extended so that they will receive at their sides from the ends of the recurved passages, the separating webs between the buckets being notched so that the elongated side of the nozzle enters the buckets to deliver a jet evenly on the curved wall; and an exhaust chamber 23 in the bucket casing, embracing, by its mouth 22, the outlet passages 21 from the nozzle and passage section, all co-acting substantially as described and for the purpose specified.

2. In an elastic fluid turbine, the combination of the casing 1, provided with the annular supply chamber 13; a suitable cover-plate 2 therefor; a nozzle and passage section made up of the block 3 having the passages 14—15 connecting therethrough from the supply chamber 13, a main block 4, and a centrally-arranged block 4', and a nozzle 16 arranged between said blocks 3 and 4; guide passages 20 and 18, the receiving sides of which extend beyond the core-block 4 and the discharge ends of which are even with the core-block, and exit passages 21 for each nozzle and passage section between the blocks 3 and 4; a turbine disk 5 with bucket segments 6 and 7 having buckets of the recurved U-shaped type with stepped walls cut away at the point of discharge so that they will discharge from their ends into the sides of the recurved passages and extended so that they will receive at their sides from the ends of the recurved passages; and an exhaust chamber 23 in the bucket casing embracing, by its mouth 22, the outlet passages 21 from the nozzle and passage section, all coacting substantially as described and for the purpose specified.

3. In an elastic fluid turbine, the combination of buckets of U-shaped recurved type and fluid reversing guide passages of similar form arranged to deliver an elastic fluid at their ends and receive the same at their sides, whereby the fluid enters the row of buckets at its side and discharges at its end into the side of the reversing passage, thence from the end of the reversing passage into the side of the opposite row of buckets, thence from the end of the opposite row of buckets into the sides of the reversing passages, thence from the ends of said reversing passages into the sides of the first named row of buckets, through the circuit a predetermined number of times, discharging from the said buckets at any predetermined point as specified.

4. In an elastic fluid turbine, buckets of U-shaped re-curved type, receiving fluid at their sides and discharging from their ends, and passages that receive fluid at their sides and discharge at their ends to convey the fluid from one row of buckets to another row of buckets.

5. In an elastic fluid turbine, buckets of U-shaped re-curved type formed open at the side at the receiving end, the receiving end being the longer.

6. In an elastic fluid turbine, the combination of a turbine wheel with oppositely-arranged and oppositely-faced bucket segments, containing buckets of the U-shaped, recurved type, the receiving sides of which buckets and bucket segments are in planes at right angles to the plane of the exit passages, the direction of the inlet and outlet passages being at an acute angle to the direction of the rotation; and intervening recurved guide passages arranged between the said bucket segments and corresponding thereto.

7. In an elastic fluid turbine, a turbine wheel or rotatable element; U-shaped buckets; and a nozzle to deliver fluid to the buckets, said nozzle having its side nearest to the center of the buckets extending beyond its outer side in the direction of the fluid flow, co-acting for the purpose specified.

8. In an elastic fluid turbine, a turbine wheel or rotatable element having U-shaped buckets; and a nozzle formed to deliver a jet of fluid at approximately equal distance from its throat to the curved walls of the said bucket, for the purpose specified.

9. In an elastic fluid turbine, a nozzle rectangular in cross-section, with parallel sides, with a pyramidal core corresponding thereto detachably and centrally supported within the nozzle that expands the elastic fluid.

10. In an elastic fluid turbine, a nozzle rectangular in cross-section, with a pyramidal core corresponding thereto centrally supported within the nozzle that expands the fluid.

11. The combination of a turbine disk or wheel with buckets of the U-shaped recurved type, formed in steps, the steps being similar and arranged side by side in substantially parallel relation; and a nozzle delivering to the said buckets.

12. A turbine disk or wheel with buckets of the U-shaped recurved type whose curved walls are formed of steps of approximately similar radius.

13. A turbine disk or wheel with buckets of the U-shaped recurved type whose curved wall is formed of steps.

14. In an elastic fluid turbine, the combination of a wheel-web with its periphery of dovetailed form; bucket segments with shanks conformed to the dovetailed portion, the said parts being shouldered together, and the buckets being formed to receive at their sides and deliver from their ends; and means for clamping said shanks onto the opposite sides of the wheel-web against the sides of the dovetail, whereby they can embrace projecting parts of recurved passages, for the purpose specified.

15. In an elastic fluid turbine, the combination of the disk; oppositely-faced segments thereon, secured to the periphery of the said disk which is formed dovetailed to receive the same by suitable bolts therethrough, the said segments being separated from each other at their ends; and elastic insulating material arranged between said segments, co-acting for the purpose specified.

16. In an elastic fluid turbine engine, the combination with the turbine disk of bucket segments secured to the periphery thereof, which segments are separated from each other in relation to permit of independent expansion of the segments; and elastic insulating material arranged between said segments, co-acting as specified.

In witness whereof, I have hereunto set my hand and seal in the presence of two witnesses.

CHARLES W. DAKE. [L. S.]

Witnesses:
 FRED L. CHAPPELL,
 LULU G. GREENFIELD.